United States Patent [19]
Conley

[11] 3,861,349
[45] Jan. 21, 1975

[54] OPERATOR ALERTING DEVICE
[76] Inventor: Cecil Conley, Rt. 1, Hinsdale, Ill. 60521
[22] Filed: Aug. 16, 1972
[21] Appl. No.: 280,958

[52] U.S. Cl.......... 116/114 R, 200/DIG. 2, 340/279
[51] Int. Cl...................... G08b 21/00, B60g 9/00
[58] Field of Search ............ 340/279, 283; 180/99; 200/DIG. 2; 116/67 R, 114 R

[56] References Cited
UNITED STATES PATENTS

| | | | |
|---|---|---|---|
| 747,370 | 12/1903 | Brislin | 200/DIG. 2 |
| 1,296,088 | 3/1919 | Jones | 200/Dig. 2 |
| 1,915,721 | 6/1933 | Diaz | 200/DIG. 2 |
| 1,988,330 | 1/1935 | Pettersson | 340/279 UN X |
| 2,187,761 | 1/1940 | Torrens | 340/279 |
| 2,271,698 | 2/1942 | Lofwall | 340/279 |
| 2,449,784 | 9/1948 | Liman | 116/114 |
| 2,568,482 | 9/1951 | Blomberg | 340/279 X |
| 2,816,282 | 12/1957 | Sewell | 340/279 UN X |
| 3,703,217 | 11/1972 | Kulick | 340/279 X |

FOREIGN PATENTS OR APPLICATIONS

| | | | |
|---|---|---|---|
| 465,868 | 9/1951 | Italy | 340/279 |
| 468,836 | 2/1952 | Italy | 340/279 |
| 545,675 | 7/1956 | Italy | 340/279 |

*Primary Examiner*—Glen R. Swann, III
*Attorney, Agent, or Firm*—Lockwood, Dewey, Zickert & Alex

[57] ABSTRACT

The operator of a mechanism, such as a motor vehicle, is provided with at least one hand-worn or glove-like member and this member carries or has attached thereto means for directly or indirectly arousing the wearer to the alert condition when the wearer's glove hand leaves manual control means such as the steering wheel of a motor vehicle. In one form or embodiment the arousing means is in the form of a single or multiple needle or nail arrangement for prickling the flesh of the wearer's hand. In another embodiment, the arousing means is in the form of a single or multiple needle or nail for pricking the wearer's thigh. In still another embodiment, the arousing means is operatively connected with a triggerable attention-producing device such as an air-powered horn, an electrically powered siren, etc.

2 Claims, 5 Drawing Figures

PATENTED JAN 21 1975    3,861,349

OPERATOR ALERTING DEVICE

The object of the invention, generally stated, is the provision of hand-worn safety devices for persons manually operating various mechanisms, such as steering a motor vehicle, operative to arouse or startle the operator or wearer to an alert condition when his hand or hands leave or drop from the steering wheel or other manual operating handle.

More specifically, a primary object of the invention is the provision of an inexpensive, fool-proof and reliable, hand-worn safety device for the operator of a motor vehicle or other manually operated mechanism which comprises a glove-like or other hand-worn member or article having means attached thereto for directly or indirectly arousing the wearer to an alert condition when a hand drops from the steering wheel or other manually operative control handle in some manner such as by pricking or jabbing the flesh of the wearer or by triggering an attention-producing device of some kind.

Certain other objects of the invention will be obvious and will appear hereinafter.

The invention relates generally to innovations and improvements in safety devices for producing an alert condition in the driver of an automobile or the operator of some other manually controlled mechanism in the event that the driver's or operator's hand or hands inadvertently leave the steering wheel or other control handle such as when the driver or operator falls off to sleep of otherwise assumes an inattentive nonoperating condition.

It is well known that automobile accidents are frequently caused by drivers becoming drowsy or going to sleep, thereby losing control of their respective vehicles. Invariably, when this occurs an operator's or driver's hands drop from the steering wheel, coming to rest on the driver's lap or thighs. Normally this happens instantaneously and if the driver can be aroused or startled into an alert condition there would be time to regain control of the vehicle and prevent the accident that would otherwise happen.

While the above problem generally or most often occurs when drivers of automobiles or trucks drowse off or fall asleep, it also happens in the case of other manually operated mechanisms such as operators of farm or industrial tractors, combines or other powered implements, operators of power boats, air craft, power shovels, cranes and the like.

Heretofore, so-called "deadman" controls have been provided, primarily in the cabs of railroad locomotives whereby if the operator's hand leaves the control handle such as a locomotive throttle, the brakes are automatically applied or some other remedial action is taken. However, such "dead man" controls are not required sufficiently often and the cost thereof is such that they have not been adopted as a practical matter for motor vehicles or other commonly operated vehicles or mechanisms of the class described.

The object of the invention, generally stated, is that provision of hand-worn safety devices for persons manually operating various mechanism, such as steering a motor vehicle, operative to arouse or startle the operator or wearer to an alert condition when his hand or hands leave or drop from the steering wheel or other manual operating handle.

More specifically, a primary object of the invention is the provision of an inexpensive, fool-proof and reliable, hand-worn safety device for the operator of a motor vehicle or other manually operated mechanism which comprises a glove-like or other hand-worn member of article having means attached thereto for directly or indirectly arousing the wearer to an alert condition when a hand drops from the steering wheel or other manually operative control handle in some manner such as by pricking or jabbing the flesh of the wearer or by triggering an attention-producing device of some kind.

Certain other objects of the invention will be obvious and will appear hereinafter.

For a more complete understanding of the nature and scope of the invention, reference may now be had to the following detailed description thereof taken in connection with the accompanying drawings wherein.

Figure 1:
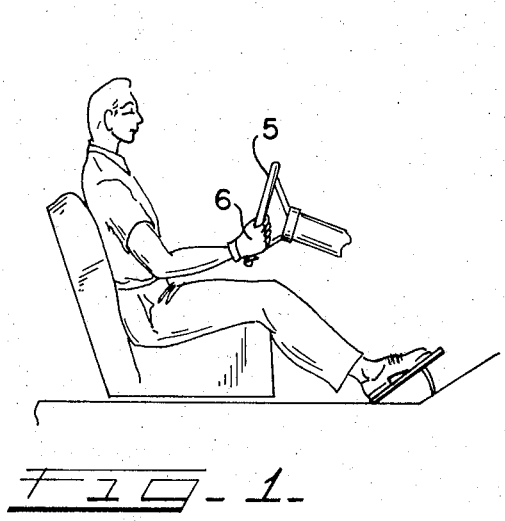
FIG. 1 is a side elevational view of a driver wearing on his right hand a safety device forming one embodiment of this invention and holding the steering wheel of an automobile.
Figure 2:
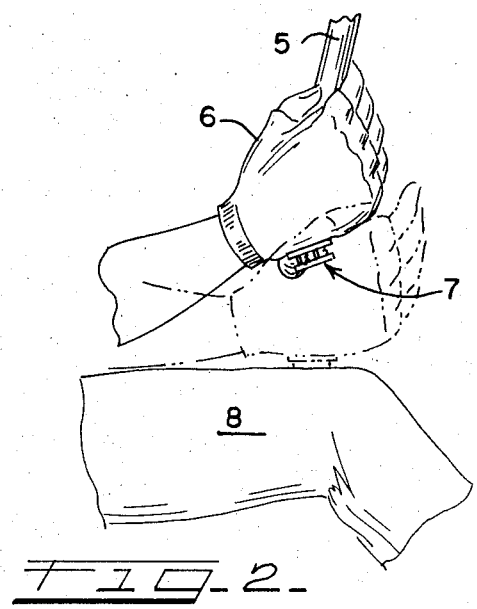
FIG. 2 is a fragmentary view showing the right hand of the driver in FIG. 1 in a normal position on the rim of the steering wheel and in broken line showing the position the driver's hand falls to on his thigh in case he drowses off or goes to sleep, the safety device of the present invention being shown in elevation.

Referring to FIGS. 1 and 2 the driver is shown in a typical seated position with his right hand gripping an automobile steering wheel 5. On his right hand the driver wears a special glove 6 which can be, for example, a cloth glove with the ends of the fingers and thumb cut off. There is secured to the side of the glove 6 opposite the thumb opening an attachment indicated generally at 7 in FIG. 2 which serves to awaken or startle the driver to an alert condition in the event he drowses off or goes to sleep while driving whereupon his right hand leaves the wheel 5 and falls to his thigh or knee which is indicated at 8.

Figure 3:
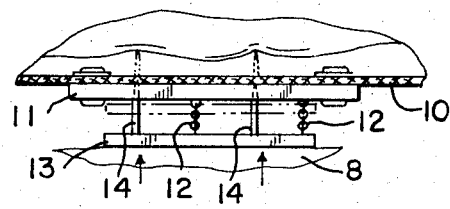
FIG. 3 is a fragmentary detail view on an enlarged scale, partly in section and partly in elevation, showing the attachment on the glove worn by the driver in FIGS. 1 and 2 which serves to arouse or awaken the driver into an alert condition in case he falls asleep or drowses off.

Referring to FIG. 3 the fabric of the glove 6 is indicated at 10 and has riveted or otherwise thereto an oblong or rectangular piece 11 which is formed or rigid or semi-rigid material such as aluminum, plastic, plywood, etc. A pair of chains 12—12 are anchored to the underside of the plate or piece 11 and serve to suspend a second rectangular or oblong rigid or semi-rigid piece 13. The piece 13 has secured thereto a pair of needles or nails 14—14 which project upwardly through apertures provided therefore in the plate element 11.

When a driver is wearing the safety glove 6 and grips the steering wheel 5 in a normal steering position as shown in FIGS. 1 and 2 in solid line, the weight of the piece 13 plus that of the nails or needles 14 is sufficient so that it sags or hangs down with the points of the needles 14 retracted into the glove fabric 10.

It will be seen that if the driver drowses off or falls asleep to the point of losing control when his hand leaves the wheel then the suspended piece 13 will engage the driver's thigh 8 above the knee and this will instantaneously push the piece 13 upwardly toward piece 11 causing the points of the needles or nails 14 to penetrate the fabric 10 and project into the flesh of the driver's hand immediately startling him awake to the alert condition.

By having the chains 12 of the appropriate length it will be seen that they do not permit the nails or needles 14 to at any time leave the apertures in the plate 11. Furthermore, by having at least two chains and at least two nails 14, the alignment of the parts of the device 11 are fully maintained in their ready condition at all times whether the glove 6 is worn or whether it is laid aside temporarily. It has been found that the points of the nails or needles 14 do not have to be so sharp as to actually penetrate the skin to the point where they draw blood in order to prick the driver sufficiently to startle him to the fully or awakened and alert condition.

It will be apparent that a number of changes in detail may be made in the device 11 and in the safety glove 6. For example, the glove can be formed of any desired material other than cloth and have any desired degree of openness or completeness. For example, it can be open for the most part such as a golfer's glove or it can be a complete lined glove such as is worn in the wintertime. In the latter case, provision should be made to have the points of the nails or needles 14 penetrate through the heavy material and into the lining of the glove in their retracted condition so that the points of the needles 14 will not have to be pushed through the heavy glove material.

It will be apparent that if there are two or more needles and apertures, one suspending chain or strap intermediate the needles will suffice. Alternately, if there are two suspending chains or straps than on intermediate needle will suffice. However, it is preferred to have a plurality of chains or straps and a plurality of needles or nails, preferably two of each.

Figure 4:
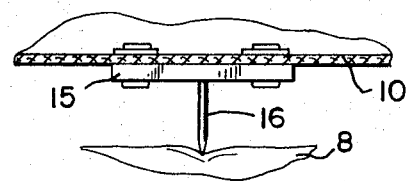
FIG. 4 is a fragmentary detail sectional view similar to FIG. 3 showing a modification.

Referring to FIG. 4 and the embodiment therein illustrated, the fabric of the glove 6 is indicated at 10 and a somewhat shorter piece of rigid or semi-rigid material 15 is shown riveted to the glove material 10. Secured to the piece 15 and outwardly projecting therefrom is a single nail or needle 16 which is unshielded and points downward when the operator grasps the wheel 5 in the normal steering position shown in FIGS. 1 and 2. In the event the driver drowses off or falls asleep so that his hand falls to his thigh 8, the needle 16 will penetrate clothing worn over the knee or thigh and will prick the flesh sufficiently so as to startle the driver to the fully awake and alert condition.

Preferably, the driver should wear one of the safety gloves 6 on each hand so as to maximize the change that he or she will be immediately awakened in the event of going to sleep or drowsing off so that one or both hands fall to his or her thighs or knees.

Figure 5:
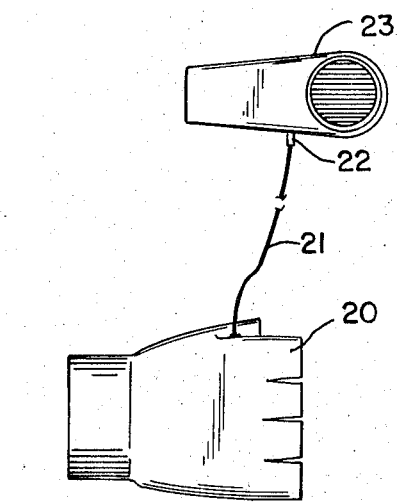
FIG. 5 is a diagrammatic view showing another embodiment of the invention in which there is a separately mounted device for arousing or awakening a driver or other operator.

It will be seen that the embodiments of the invention shown in FIGS. 1–4 are inexpensive, easily maintained in operating condition over long years of service and are effective in performing their intended purpose. A different and somewhat more elaborate embodiment of the invention is illustrated in FIG. 5 where a safety glove 20 is shown having permanently attached thereto one end of a cord 21 having the opposite end thereof attached at 22 to an electrically operated siren device 23 of known commercial type, for example, the personal protector siren alarm, Model PSA-1 manufactured by Fedtro, Inc. of New York, N.Y. This is a battery operated device and upon pulling the pin or trigger 22, the siren is set off instantly. It will be seen that the siren or alarm device 23 should be mounted above the steering wheel such as being attached to the car's roof, rear view mirror or to one of the sun shades.

The driver puts his hand in the glove 20 and proceeds to operate the car in normal fashion. If he should drowse off or go to sleep his hand falls off the steering wheel and the weight and momentum of the falling hand will be enough to pull the pin 22 and set off the alarm 23.

As an alternative to the battery operated siren 23, the cord 21 should be attached to operate other alertness-producing or awakening devices such as a gas powered air horn of the type used on small boats and in other places where it is desired to sound this type of alarm. One such device is manufactured by Buell Manufacturing Co. of Lyons, Ill.

I claim:

1. A hand-worn safety device for vehicle drivers at least one of whose hands should be grasping a steering wheel for safe operation of said vehicle comprising a glove-like or hand-worn member and means attached to said member for arousing the wearer to an alert condition when the wearer's gloved hand drops from said steering wheel, and wherein said means for arousing the wearer to an alert condition comprises a first rigid or semi-rigid element secured to the material of said glove-like or hand-worn member with at least one aperture therein, a second rigid or semi-rigid element suspended from said first element and being adapted to penetrate said glove-like or hand-worn member and prick the hand of said wearer when the wearer's gloved hand falls and said second element strikes the thigh of said wearer.

2. The hand-worn safety device of claim 1 wherein said first element has a pair of spaced apertures therein and said second element has a pair of said prickling members each of which projects into one of said apertures.

* * * * *